United States Patent
Xiao et al.

(10) Patent No.: US 7,127,436 B2
(45) Date of Patent: Oct. 24, 2006

(54) GENE EXPRESSION PROGRAMMING ALGORITHM

(75) Inventors: Weimin Xiao, Hoffman Estates, IL (US); Thomas Michael Tirpak, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 815 days.

(21) Appl. No.: 10/101,814

(22) Filed: Mar. 18, 2002

(65) Prior Publication Data

US 2003/0177105 A1 Sep. 18, 2003

(51) Int. Cl.
G06F 15/18 (2006.01)
G06N 3/00 (2006.01)
G06N 3/12 (2006.01)

(52) U.S. Cl. ..................................................... 706/13
(58) Field of Classification Search .................... 706/13
See application file for complete search history.

(56) References Cited

U.S. PATENT DOCUMENTS

| | | | |
|---|---|---|---|
| 4,697,242 A * | 9/1987 | Holland et al. ................ | 706/13 |
| 4,935,877 A * | 6/1990 | Koza ........................... | 706/13 |
| 5,136,686 A | 8/1992 | Koza | |
| 5,148,513 A | 9/1992 | Koza | |
| 5,343,554 A | 8/1994 | Koza et al. | |
| 5,390,282 A | 2/1995 | Koza et al. | |
| 6,272,479 B1 * | 8/2001 | Farry et al. ................... | 706/13 |
| 6,336,107 B1 * | 1/2002 | Uchida et al. ................. | 706/13 |

FOREIGN PATENT DOCUMENTS

| | | |
|---|---|---|
| WO | WO 91/14990 | 10/1991 |
| WO | WO 92/05497 | 4/1992 |
| WO | WO 97/32261 | 9/1997 |

OTHER PUBLICATIONS

Utilising path-coherence to combat multipath and multiuser interference Xiao Weimin; Wang Jing; Yao Yan; Electronics Letters□□vol. 33, Issue 7, Mar. 27, 1997 pp. 564-565 □□.*

A new linear multiuser detector in asynchronous CDMA systems Xiao Weimin; Wang Jing; Yao Yan; Communication Technology Proceedings, 1996. ICCT'96., 1996 International Conference on vol. 2, May 5-7, 1996 pp. 1114-1117 vol. 2 Digital Object Identifier 10.1109/ICCT.1996.545079.*

A note on a fractal architecture for modelling and controlling flexible manufacturing systems Tirpak, T.M.; Daniel, S.M.; LaLonde, J.D.; Davis, W.J.; Systems, Man and Cybernetics, IEEE Transactions on vol. 22, Issue 3, May-Jun. 1992 pp. 564-567.*

Optimization of high-speed multistation SMT placement machines using evolutionary algorithms Weihsin Wang; Nelson, P.C.; Tirpak, T.M.;Electronics Packaging Manufacturing, IEEE Transactions on [see also Components, Packaging and Manufacturing Technology, Part C: Manufacturing, IEEE Transactions on] vol. 22, Issue 2, Apr. 1999 pp. 137-146.*

(Continued)

Primary Examiner—Anthony Knight
Assistant Examiner—Michael B. Holmes

(57) ABSTRACT

A gene expression programming genetic algorithm for performing symbolic regression is provided. The algorithm avoids expression bloating and over fitting by employing a fitness function that depends inversely on the mathematical expression complexity. Members of a population that are evolved by the algorithm are represented as a set arrays (e.g., in the form of a matrix) of indexes that reference operands and operators, thus facilitating selection, mutation, and cross over operations conducted in the course of evolving the population. The algorithm comprises a syntax checking part that may be applied to population members without their having to be converted to executable programs first. An object-oriented programming language data structure is providing for encapsulating basic data for each codon (e.g., operand, operator) used by the algorithm.

31 Claims, 7 Drawing Sheets

OTHER PUBLICATIONS

Evolving accurate and compact classification rules with gene expression programming Chi Zhou; Weimin Xiao; Tirpak, T.M.; Nelson, P.C.; Evolutionary Computation, IEEE Transactions on vol. 7, Issue 6, Dec. 2003 pp. 519-531.*

Optimization of revolver head SMT machines using adaptive simulated annealing (ASA) Tirpak, T.M.; Nelson, P.C.; Asmani, A.J.; Electronics Manufacturing Technology Symposium, 2000. Twenty-Sixth IEEE/CPMT International Oct. 2-3, 2000 pp. 214-220.* http://www.wolfram.com/ MATHEMATICA.
http://www.mathsoft.com/ mathcad.
http://www.mathworks.com/ MATHLAB.
http://www.sas.com/products/index.html.
http://www.averill-law.com/ExpertFit-distribution-fitting-overview.htm.

Candida Ferreira; *Gene Expression Programming: A New Adaptive Algorithm for Solving Problems* to appear in *Complex Systems*, 2001, pp. 1-22.

Candida Ferreira; *Gene Expression Programming: a New Adaptive Algorithm for Solving Problems, Complex Systems*, vol. 13, issue 2:87-129, 2001, pp. 1-22.

Candida Ferreira; *Gene Expression Programming in Problem Solving*, WSC6 tutorial 2001, pp. 1-22.

J.R. Koza; *Genetic Programming*, MIT Press, Cambridge, MA 1992, entire book.

* cited by examiner

500 ↓

[sqrt,+,pow,pow, /, 2, /,2,-,*,-,*,x,/,2,2, y,/,2,3,3,2,5,2,..., codon (PA(N,K))]

$$\sqrt{(.25000003670\ x-\ .3751456890)^2 + (.168324567\ y-\ .41789368)^2}$$

GENE EXPRESSION PROGRAMMING ALGORITHM

FIELD OF THE INVENTION

The present invention relates to genetic algorithms.

BACKGROUND OF THE INVENTION

Algorithms for fitting experimental data to linear equations or to other predetermined functions of one or more variables are widely used in applied science and engineering. In fitting data to a predetermined function, parameters (e.g., coefficients) of the predetermined function, which are a priori unknown, are determined. These parameters, which may represent theoretical constants (e.g., the mass of an electron), or merely empirical values that characterize a phenomenon, are determined in fitting data to the function. In such situations, the appropriate function to fit to the data is selected by a person based on technical knowledge or preexisting evidence. For example, certain types of data may be known by experts in the relevant field to be described by certain mathematical functions. The discovery of what mathematical functions describe what type of functions comes through the painstaking progress of science and engineering.

Similarly, in the field of statistics, statistical data may be fit to an appropriate distribution function such as the Gaussian Distribution, or the Binomial Distribution, in order to determine a mean and variance of measured data. The selection of an appropriate distribution function to fit to any given set of data is based on consideration of whether the type of random variation associated with each type of distribution corresponds to the random variations that characterize the collected data. In other words, selection is ordinarily the work of person skilled in statistics.

Certain statistical packages attempt to assist the statistician by automatically trying to fit a set of data to a predetermined set of distribution functions, and selecting the distribution function which best fits the data.

In the cases mentioned above the functions to which data are fit are predetermined, and it remains a task of the scientist or engineer to discover through conjecture or ab initio derivation entirely new functions that may apply to new types of data. In other words the work of discovering mathematical functions is left to human intellect.

The field of artificial intelligence includes the sub-field of genetic algorithms. In the field of genetic algorithms, an attempt is made to mimic the role of genetics in evolutionary biology, in computing the solution of engineering or other problems. In genetic algorithms a population of postulated solutions is 'evolved' in a way that mimics Darwinian theories of evolution.

The field of genetic algorithms includes an area of study known as genetic programming. In genetic programming the population being evolved includes individuals that are themselves programs. In genetic programming the fitness of each individual program is judged based on its ability to solve a certain problem when it is executed.

Genetic programming has been used to perform what is known as 'symbolic regression'. In symbolic regression, an effort is made to supplant human intellect by using genetic programming to discover a mathematical expression that best describes a data set. The individual programs that are evolved in genetic programming based symbolic regression represent mathematical equations that give the value of a dependent variable based on the input values of one or more independent variables.

Predominant prior art genetic programming algorithms were implemented in the LISP programming language which was judged by the implementers to be especially suited to the task. In such algorithms, the S-expression construct of the LISP programming language was used to represent mathematical expressions. These S-expressions, which played the role of members of a population being evolved, were directly manipulated in the course of performing the evolution. A drawback of such prior art approaches is that the size of the mathematical expressions in the population was not limited, which lead to so called 'expression bloating' in which the mathematical expressions in the population become unduly large. Another drawback of such prior art approaches is that such bloated expressions tend to over fit the data that the genetic programming algorithm is using to check the correctness of mathematical expressions. By over fit it is meant that the expression conforms very closely to the data including measurement errors in the data, and does not conform to additional data from the same source that is later used to test the correctness of the expression. A further drawback is that such S-expression constructs are not available in modern program languages such as Java, or C++ that are currently preferred for use in the scientific and engineering programming.

Another type of genetic algorithm used for symbolic regression Gene Expression Programming (GEP). In Gene expression programming expressions are represented by strings of symbols in which each symbol represents a token (e.g., operand, operator) of a mathematical expression. In using gene expression programming the value of constants that are to appear in an expression that the genetic programming algorithm is seeking may not be known ahead of time. Therefore the GEP algorithm may have to create a program that performs an inordinate number of operations on a limited set of constants that it has been given to work with (e.g., zero and one). The latter necessity increases the time required for the gene expression programming algorithm to converge and also unduly increase the size of solution programs that are found. Moreover, in as much as the expressions produced by gene expression programming algorithms are limited to a finite size, the operation required to obtain needed constants may consume a substantial portion of a maximum expression size and limit what is available for other needed operators and variables.

In gene expression programming a variety of actions that mimic the natural processes involved in the evolution of a population are performed. These include one-point and two-point crossover and mutation. These processes involve random selection of crossover points and random selection of new tokens to replace pre-existing tokens (operands or operators) in a representation of an expression (chromosome). Due to their random nature these operations, which are important in adaptation through evolution, may, unfortunately, in the case of gene expression programming, lead to syntactically incorrect expressions (programs). Such syntactically incorrect are unsuitable as solution candidates, and have the potential to generate a program execution error in the gene expression programming algorithm.

BRIEF DESCRIPTION OF THE FIGURES.

FIG. 5 is an array of operators and operands that includes a representation of a mathematical expression.

FIG. 6 is an array of indexes that represents the array shown in FIG. 5.

FIG. 7 is a hypothetical mathematical expression to be determined by the method shown in FIG. 1

FIG. 8 is an approximation of the mathematical expression shown in FIG. 7 that includes prime number based constants.

DETAILED DESCRIPTION OF THE PREFERRED EMBODIMENTS

Figure 1:
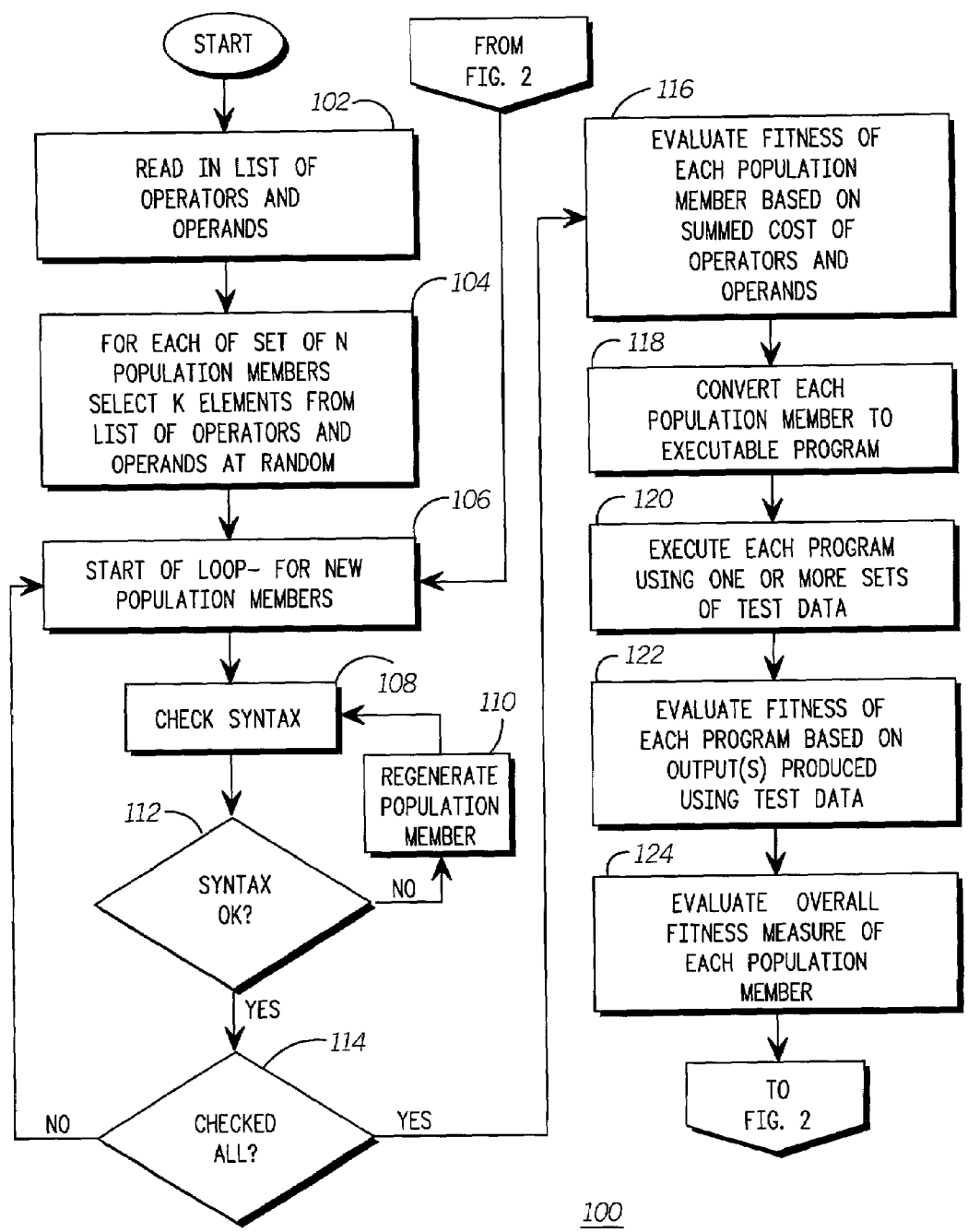
FIG. 1 is a first part of a flow diagram of an algorithm for evolving a population of representations of mathematical expressions according to the preferred embodiment of the invention.
Figure 2:
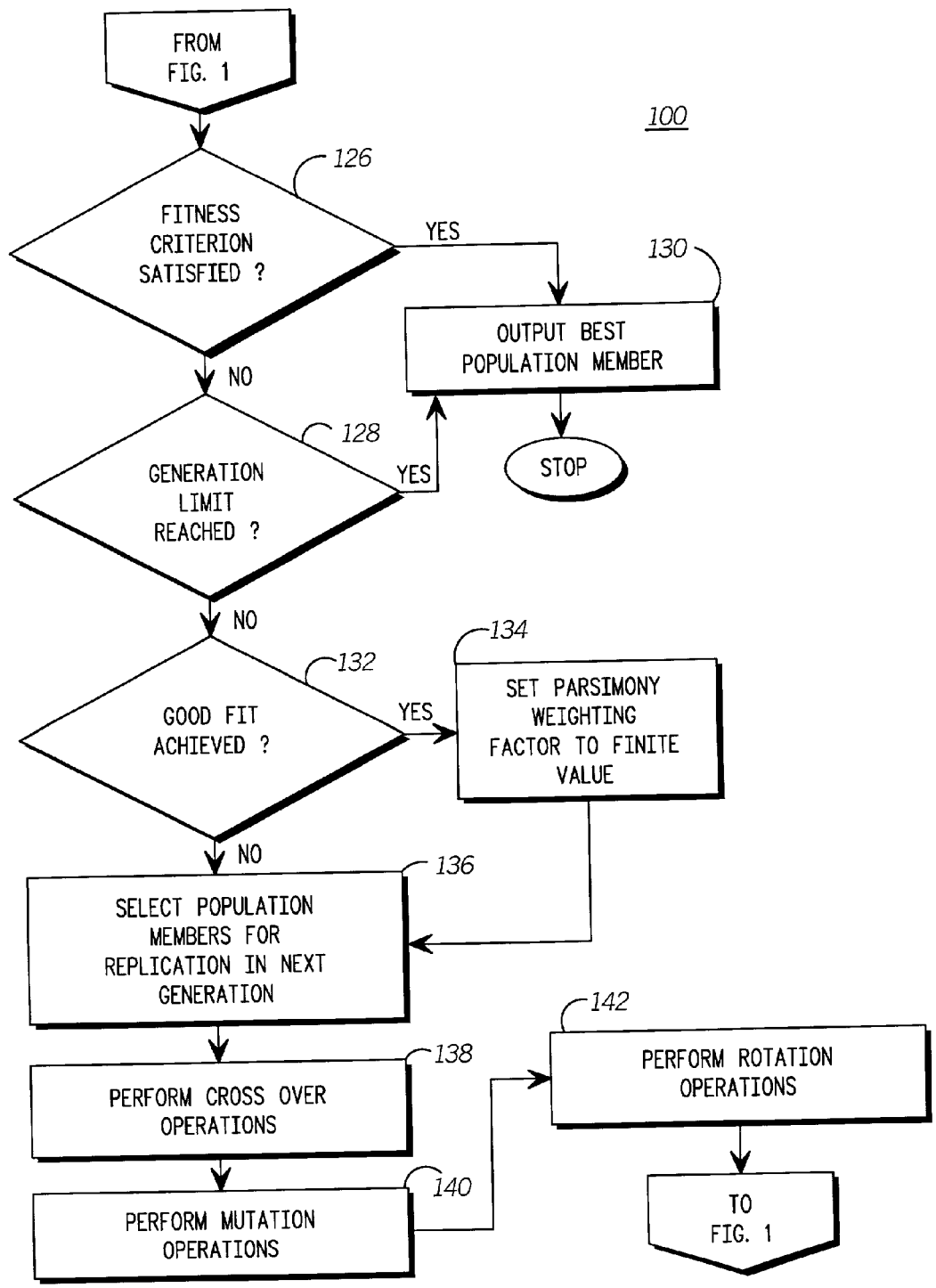
FIG. 2 is a second part of the flow diagram begun in FIG. 1.

FIG. 1 is a first part of a flow diagram of an algorithm 100 for evolving a population of representations of mathematical expressions according to the preferred embodiment of the invention, and FIG. 2 is a second part of the flow diagram begun in FIG. 1. The algorithm 100 shown in FIGS. 1, 2 is a Gene expression programming (GEP) type genetic algorithm (GA). The genetic algorithm 100 is used to determine a mathematical expression that fits data well. The data may comprise one or more sets of associated independent and dependent variable values. There may be one or many independent variables depending on the nature of the mathematical expression being sought.

Referring to FIG. 1, in step 102 a list of operators and operands to be used is read in. The list may be stored in a configuration file. It is appropriate for a wide variety of technical fields to include addition, subtraction, multiplication, and division among the operators read in in step 102. In a wide variety of technical fields it is also appropriate to include trigonometry function operators such as sine cosine, tangent, and inverse trigonometry functions such as arcsine, arccosine, and arctangent. Note that operators may be classified according to the number of operands upon which they operate. Other types of functions may also be included. The MAX function accepts two operands or mathematical sub expressions as arguments, evaluates the two arguments, and returns the value of the arguments that is larger. The complementary MIN function may also be included.

Another type of operand, that is familiar as a flow control construct in programming, namely the IF {sub expression-one<=sub expression-two} THEN {sub expression three} ELSE {sub expression four} (succinctly referred to as the IF operator), may also be included. The latter is useful in discovering piecewise defined functions. Note that the IF operator accepts four arguments, a first and second sub expressions used in an inequality condition, a third sub expression to be executed if the condition is met, and a fourth sub expression to be evaluated if the condition is not met.

It may be appropriate to include operators based on special functions that arise often in a specific field. For example, if the algorithm 100 is to be applied to the field of Neural Networks, it may be appropriate to include an operator based on the Sigmoid function.

Table I includes an exemplary list of operators that may be read in in step 102. In table I, the first column indicates names of operators, the second column indicates operator type which is equivalent to the number of operands that an operator accepts as arguments, the third column is reserved for values (which is inapplicable to operators and therefore has no value in table I), the fourth column gives a cost associated with each operator, the latter being a measure of a degree to which each operator increase the complexity of mathematical expressions, and the fifth column is an index by which the operator is referenced.

TABLE I

| NAME | TYPE | VALUE | COST | INDEX |
|---|---|---|---|---|
| THREE ELEMENT OPERATORS | | | | |
| IF | 4 | — | 3 | 1 |
| TWO OPERAND OPERATORS | | | | |
| + | 2 | — | 1 | 2 |
| - | 2 | — | 1 | 3 |
| * | 2 | — | 1 | 4 |
| / | 2 | — | 1 | 5 |
| MIN | 2 | — | 2 | 6 |
| MAX | 2 | — | 2 | 7 |
| POW | 2 | — | 2 | 8 |
| ONE OPERAND OPERATORS | | | | |
| SIN | 1 | — | 2 | 9 |
| COS | 1 | — | 2 | 10 |
| TAN | 1 | — | 2 | 11 |
| EXP | 1 | — | 2 | 12 |
| LOG | 1 | — | 2 | 13 |
| SQRT | 1 | — | 2 | 14 |
| GUASS | 1 | — | 2 | 15 |
| SIGMOID | 1 | — | 2 | 16 |

The operands that are read in step 102 include constants and independent variables. Table II below includes an exemplary list of operands that are read in step 102. The identity of the columns in table II is the same as in table I. The index numbers in table II continue the index number sequence started in table I The first row (row 17 by index number) of Table II includes Pi which is included because experience has shown that it often appears in mathematical expressions related to science and engineering problems. Other appropriate constants that are significant in a wide range of fields (e.g., the natural logarithm base, e) or constants that are applicable to a particular field of study (e.g., Plank's constant) may be included in Table II if is thought there is a chance that they appear in a mathematical expression being sought. The following row (index 18) of table II includes the zero operand. Inclusion of zero allows the algorithm 100 to effectively turn off parts of mathematical expressions that the algorithm 100 is evolving, e.g., by multiplying a sub expression by zero, without otherwise disturbing the mathematical expressions. Gene Expression Programming is sensitive to the sequence of operators and operands in a representation of mathematical expressions. According to an alternative embodiment of the uno( ) function is included among the operators read in in step 102. The uno( ) function returns its argument unchanged. The inclusion of the uno( ) function allows for portions of a mathematical expression represented by a population member to be deactivated by the GEP algorithm without otherwise distorting the population member. Deactivated portions may be activated through crossover or mutation in a subsequent generation.

The next row (index 19) of table II includes the number one (1). One has a special role in the real number system in that any integer or rational number may be formed by summing one or dividing sums of one respectively. Thus providing one to the algorithm 100, in principle, allows the algorithm 100 to generate any numbers of the foregoing types if necessary in a mathematical expression being generated.

Tables I and II include the raw material used by the algorithm 100 in determining a mathematical expression. The contents of Table I and II (which in practice may be represented as arrays or other data structures) will be used to generate an initial population of representations of mathematical expression, and will be drawn from in performing mutation operations.

The next group of rows (indexes 20–42) of table II include a sequence of prime numbers. By combining two or more of the prime numbers in products, sums, quotients, and differences, a variety of numbers may be generated by sub-expressions that are relatively simple compared to what would be needed to generate the same numbers using only the number one. Thus, the inclusion of the sequence of prime numbers in TABLE tends to reduce the number of generations required for the algorithm 100 to find a mathematical expression that describes a set of real world data, and also tends to reduce the complexity of mathematical expressions that are found.

The independent variables to be included in mathematical expressions generated by the algorithm 100 may be identified in a file that includes training data that is used to evaluate the fitness of programs produced by the GEP algorithm 100. A standard file format that is used for training data and includes identifications of independent variables associated with the data is known as the Academic Data Mining Research file format or ARFF. The last two entries in table II-X and Y are exemplary independent variables. The number of independent variables in table II corresponds to the number of independent variables in real world data for which the algorithm 100 seeks a mathematical expression. For certain problems there may be only one independent variable or more than two.

TABLE II

| NAME | TYPE | VALUE | COST | INDEX |
|---|---|---|---|---|
| OPERANDS | | | | |
| Pi | 0 | 3.14159 | 0 | 17 |
| 0 | 0 | 0.0 | 0 | 18 |
| 1 | 0 | 1.0 | 0 | 19 |
| PRIME NUMBER OPERANDS | | | | |
| 2 | 0 | 2.0 | 0 | 20 |
| 3 | 0 | 3.0 | 0 | 21 |
| 5 | 0 | 5.0 | 0 | 22 |
| 7 | 0 | 7.0 | 0 | 23 |
| 11 | 0 | 11.0 | 0 | 24 |
| 13 | 0 | 13.0 | 0 | 25 |
| 17 | 0 | 17. | 0 | 26 |
| 19 | 0 | 19. | 0 | 27 |

TABLE II-continued

| NAME | TYPE | VALUE | COST | INDEX |
|---|---|---|---|---|
| 23 | 0 | 23.0 | 0 | 28 |
| 29 | 0 | 29.0 | 0 | 29 |
| 31 | 0 | 31.0 | 0 | 30 |
| 37 | 0 | 37.0 | 0 | 31 |
| 41 | 0 | 41.0 | 0 | 32 |
| 43 | 0 | 43.0 | 0 | 33 |
| 47 | 0 | 47.0 | 0 | 34 |
| 53 | 0 | 53.0 | 0 | 35 |
| 59 | 0 | 59.0 | 0 | 36 |
| 61 | 0 | 61.0 | 0 | 37 |
| 67 | 0 | 67.0 | 0 | 38 |
| 71 | 0 | 71.0 | 0 | 39 |
| 79 | 0 | 79.0 | 0 | 40 |
| 83 | 0 | 83.0 | 0 | 41 |
| 89 | 0 | 89.0 | 0 | 42 |
| X | 0 | — | 0 | 43 |
| Y | 0 | — | 0 | 44 |

Referring again to FIG. 1, in the next step 104, in order to generate a population of N representations of mathematical expressions (population members), for each of the N representation, a set of K elements from the list of operands and operators that were read in in step 102 (e.g., shown in FIGS. 1,2) are selected at random.

Figure 3:
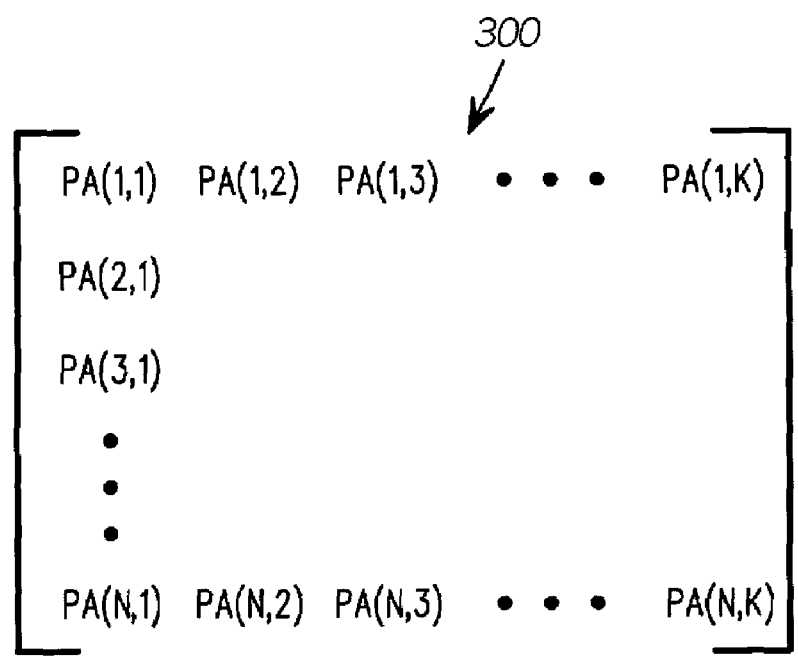
FIG. 3 shows a matrix used to store the population of representations of mathematical expression that are evolved by the method shown in FIGS. 1–2.

FIG. 3 shows a matrix 300 used to store the population of representations of mathematical expression that are generated in step 104 (FIG. 2) and evolved by the algorithm shown in FIGS. 1–2. Each population member generated in step 104 is preferably stored as row or column (shown as a row in FIG. 3). The elements of the matrix, are written as PA(1,m) where 1, the row index, designates a population member, and m, the column index, designates an mth element within each population member. (PA stands for population array.) Thus, each row of matrix 300 is an array that includes a representation of a mathematical expression. At this initial stage the syntax of each expression has yet to be validated. The matrix elements of the matrix 300 include index numbers that correspond (according to the fifth column of table I and II) to particular operators or operands. The matrix 300 may be viewed as a set of arrays each of which represent a population member. In as much as programming languages are generally designed so that matrix manipulation operations, (e.g., row copying, element exchange) are carried out speedily, operations that are to be performed on the population of representations of mathematical expressions (e.g., selection, crossover, mutation) are facilitated and accelerated (i.e., have reduced computational cost) because the population of mathematical expressions is represented by a set of arrays, e.g., by the matrix 300.

FIG. 5 shows an array 500 of operators and operands that includes a representation of a mathematical expression. FIG. 5 illustrates the sequence of operators and operands that are referred to in each row of matrix 300 (FIG. 3). FIG. 6 is an array 600 of indexes that represents the array shown in FIG. 5. As shown in FIG. 6, operands and operators are represented by a set of indexes that correspond (through Tables I and II) to the sequence of operators and operands shown in FIG. 5. That is each operator or operand appearing in the illustrative array 500 is actually represented by an index number in array 600, and in matrix 300. The indexes stored in array 600 are codons for operators or operands. Matrix 300 (FIG. 3) includes the number N of arrays of the type shown in FIG. 6 as rows. Note that each population member represented as a row of matrix 300 (FIG. 3), and arrays 500

(FIG. 5) and 600 (FIG. 6) may at times during the execution of the genetic algorithm 100 include more elements than are necessary to form a syntactically correct mathematical expression. The excess elements which come at the end of the arrays 500, 600 are nonetheless carried over to subsequent generations, and may through cross over operations or mutation become part of a mathematical expression.

Referring again to FIG. 1, the next block 106 is the top of a loop that successively checks the syntax of each new population member (row of matrix 300) to determine whether it represents a valid mathematical expression. In step 108 the syntax of a representation of a mathematical expression is checked. Details of the process performed in step 108 according to a preferred embodiment of the invention are described below in more detail with reference to FIG. 4. Block 112 is a decision block, the outcome of which depends on whether the syntax checked in step 108 is correct. If the syntax is not correct then the algorithm 100 branches to step 110 in which the population member (representation of a mathematical expression) is regenerated. The population member may be regenerated by reselecting operands and operators at random. Alternatively, the population member may be modified (e.g., randomly) in order to correct the syntax. After step 110, the algorithm 100 loops back to step 108. If it is determined in block 112 that the syntax of the mathematical expression checked in step 108 is correct, then the algorithm continues with block 114. In block 114 it is determined if there are further population members to be checked. If so, then the algorithm 100 loops back to step 106 and thereafter processes a next population member. If all of the population members have been checked then the algorithm 100 continues with step 116.

In step 116 a first fitness measure is computed for the mathematical expressions represented in the population (e.g., in array 300, FIG. 3). The first fitness measure is related to the complexity of the mathematical expressions represented in the population. In terms of the first fitness measure, greater complexity equates to reduced fitness. The first fitness measure involves a sum over a represented mathematical expressions of the costs associated with operators and operands. The cost associated with operators and operands is given in the fourth column of tables I and II. According to the preferred embodiment of the invention the first fitness measure is computed by the following equation:

$$FM_i = \frac{AvgCost}{AvgCost + Cost_i} \quad \text{EQU. 1}$$

Where, $FM_i$ is the first (fitness related) fitness measure of an ith population member (mathematical expression),
$Cost_i$ is the sum the costs associated with the operators of the ith expression,
AvgCost is an average of the sums of the cost, $Cost_i$, over a population.

The cost associated with each operator is given in the fourth colunm of Table 1. Note that the first fitness measure $FM_i$ is always between zero and one. Equation 1 may also be used in computing the first fitness measure for successive generations of the population.

Referring again to FIG. 1 in step 118 each population member (e.g., row of matrix 300) is converted to an executable program that embodies a mathematical expression that is represented in the population member.

Figure 9:
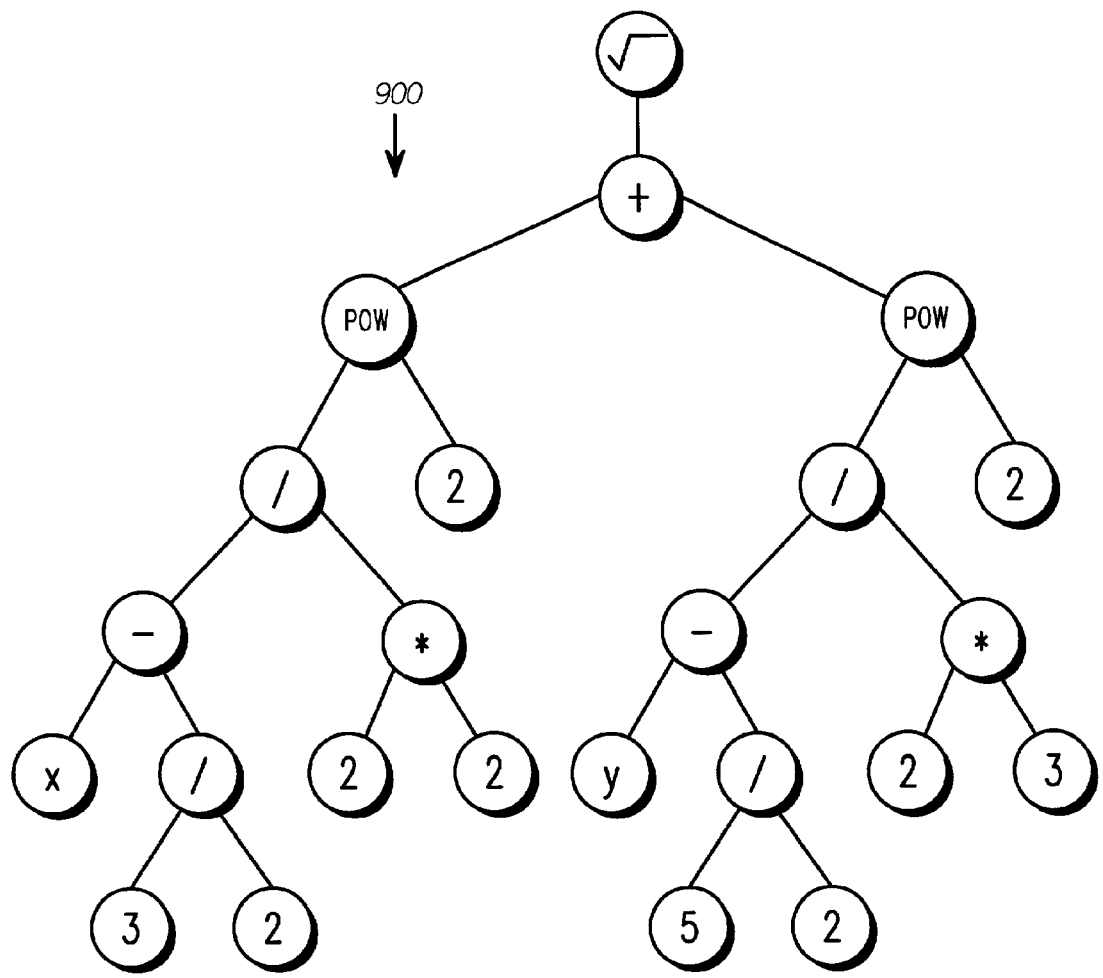
FIG. 9 is a tree diagram representing the equation shown in FIG. 8.

FIG. 7 shows a hypothetical mathematical expression 700 to be determined by the method shown in FIG. 1, and FIG. 8 shows an approximation 800 of the mathematical expression 700 shown in FIG. 7. Constants that appear in the expression 700 shown in FIG. 7 are approximated using prime numbers and one in the expression 800 shown in FIG. 8. The expression 800 shown in FIG. 8 corresponds to the representations of mathematical expression included in the arrays shown in FIGS. 5,6. FIG. 9 is a tree diagram 900 representing the equation shown in FIG. 8. FIG. 9 is also helpful in understanding the correspondence between the mathematical expression 800 shown in FIG. 8, and the representations of the mathematical expression shown in FIGS. 5 and 6. The tree diagram 900 is constructed from the array 500 shown in FIG. 5, by starting from the left in the array 500 and following a breadth first rule in building out the tree diagram 900. Tree diagram 900 reflects ordinary rules regarding the order of operations.

According to the preferred embodiment of the invention the algorithm 100 is written in a modern object-oriented programming language. Basic information for each codon (operand or operator) is preferably encapsulated in an instance of a class. A prototype of a Java class called codon that is suitable for encapsulating basic information for each operand or operator is shown below. The codon class preferably includes an instance variable for each item listed in the five columns of tables I and II, i.e., for name, type, value cost, and index. An instance of codon class is generated for each row of tables I and II.

```
public class Codon
{
public String    Name;      //codon name
public int       Type;      //number of operation elements
                            // = 3 IF (if . . . then . . . else . .
                            // = 2 operator {+, -, *, /, . . .}
                            // = 1 function {sqrt, sigmoid, . . .}
                            // = 0 constant {1, 2, 3, 5, . . .}
                            // = -1 variable
public int       Index;     //position index for fast manipulation
public double    Cost;      //cost of the codon to be applied
public double    Value;     //value of constant and variable type codon
}
```

The instances of the codon class are used as the basic building blocks for generating executable programs that encode mathematical expressions represented by population members. Instances of the codon class may be used in instances of a node class that also includes additional information (instance variables) including parent node references and child node references. Instances of the node class may be used in an expression tree class that captures structure information for an entire mathematical expression. The information in an instance of the expression tree class includes the expression tree structure such as represented graphically in FIG. 9.

Referring again to FIG. 1, in step 120 the executable programs generated in step 118, are executed using one or more sets of test data. The test data may for example comprise a number of sets of associated independent and dependent variable values that were gathered by observation (e.g., in the context of experiments or surveys). Independent variable values are used as program parameters in executing the programs in step 118, and the output of the programs executed in step 118 is judged against the value of associated dependent variable values. For example, in seeking a mathematical expression that closely matches a function of two variables, multiple sets of data of the form $(X_j, Y_j, Z_j)$ where $X_j$, and $Y_j$ are independent variables, and $Z_j$ is a dependent variable would be used. The independent variables $X_j$, $Y_j$ in each set serve as program parameters, and the output of each program execution is compared against an associated $Z_j$. In an objected-orient programming language implementation that includes an expression tree class that has references to node classes that reference codon classes, program execution amounts to evaluating an instance of the aforementioned expression tree class.

In step 122 a second measure of fitness that is based on the degree to which the mathematical expressions represented by each population member fits the one or more sets of test data is computed using the outputs obtained in step 122. The second measure of fitness is preferably based on a raw root mean square (RMS) measure of fitness give by equation 2 below:

$$RMS_i = \sqrt{\frac{1}{M}\sum_{j=1}^{M}(z_j - PROG_i(X_j^1, X_j^2, X_j^3, \ldots X_j^L))^2} \quad \text{EQU. 2}$$

where, $Z_j$ is a dependent variable value in a jth test data set;

$X_j^1, X_j^2, X_j^3, \ldots X_j^L$ is a set of independent variable values in the jth test data set;

L is the number of dependent variables;

$PROG_i$ represents an ith program that embodies a mathematical expression represented by an ith population member;

M is the number of test data sets; and $RMS_i$ is a value of the raw root mean square measure of fitness for the ith program.

The raw RMS fitness given by equation 2 is preferably rescaled using equation 3 below to derive the second measure of fitness:

$$SM_i = \frac{AvgRMS}{AvgRMS + RMS_i} \quad \text{EQU. 3}$$

where, AvgRMS is an average of $RMS_i$ over a generation.

In using equation three to evaluate the second measure of fitness for population members in successive generations, preferably, the lowest value of AvgRMS from preceding generations is used if it is lower than the value of AvgRMS for the current generation. In using equation one to evaluate the first measure of fitness for population members the AvgCost from the generation that has the lowest value of AvgRMS so far is used. The first measure of fitness $SM_i$ has a value between zero and one.

In step 124 an overall measure of fitness that takes into account the first measure of fitness and the second measure of fitness is computed. The overall measure of fitness is preferably computed using equation 4 below.

$$F_i = (1-p) \cdot SM_i + p \cdot FM_i \quad \text{EQU. 4}$$

where, $F_i$ is an overall measure of fitness of an with program that embodies a mathematical expression of a function that is represented by an ith population member; and p is a parsimony weighting factor that determines the weight to be given to the first (cost related) measure of fitness in the overall measure of fitness.

According to the preferred mode of using the algorithm 100, the parsimony weighting factor p is initially set to zero, and after a low value of raw root mean square measure of fitness is obtained, the parsimony weighting factor is set to finite value. The parsimony weighting factor is preferably a positive number less than 0.2 and more preferably less than 0.1, so that the first (cost related) measure of fitness is not given undue weight at the expense of the second (fit related) measure of fitness. When set to finite value the parsimony weighting factor is preferably at least 0.05. By including the first (cost related) fitness measure in the overall measure of fitness, the size of mathematical expressions found by the algorithm 100 is reduced. The inclusion of the first cost related fitness measure also tends to eliminate mathematical expressions that over fit the test data sets.

Referring to FIG. 2 a second part of the algorithm 100 is shown. Block 126 is a decision block, the outcome of which depends on whether a fitness criterion is satisfied. The fitness criterion tested is preferably a requirement that the overall measure of fitness (including both the first and second measures of fitness) exceed an overall fitness threshold. If the fitness criterion is satisfied, then the algorithm 100 continues with step 130 in which the best population member is output. If the fitness criterion is not satisfied, then the algorithm 100 continues with block 128. If the overall measure of fitness is satisfied but the parsimony weighting factor is set to zero, then the fitness criterion will not be determined in block 126 to have been met.

In block 128 it is determined if a generation limit has been exceeded. The discussion given above addresses steps applied to an initial population (i.e., the population generated in step 104), however as will be clear from the remainder of the discussion below, the algorithm 100 operates recursively, so that block 128 will be reached for each of a succession of generations. The generation limit is preferably imposed to restrict the number of generations that the genetic algorithm 100 may recursively generate. The generation limit serves to control the consumption of computer resources and thereby the run time for the algorithm 100. If the generation limit is reached, then the algorithm 100 proceeds to step 130 in which the best population member is output. Alternatively, in lieu of stopping the population may randomly perturbed, and execution continued. If the generation limit is not exceeded, the algorithm 100 continues with block 132.

Block 132 is another decision block, the outcome of which depends on whether a good fit to the test data has been achieved. Whether or not a good fit has been achieved may be determined by comparing the lowest raw root mean square measure of fitness of the current generation to a RMS threshold. If it is determined in block 132 that a good fit has been achieved, then the algorithm 100 continues with step 134 in which the parsimony weighting factor is increased. In step 134 the parsimony weighting factor is preferably changed from zero to a finite value in one step. After step 134, the algorithm continues with step 136. If in step 132 it is determined that a good fit has not been achieved, then the algorithm proceeds directly to step 136.

In step 136, population members from a current population are selected for replication in a successive generation. Preferably, at least some of the population members selected for replication are selected based on their fitness. According to the preferred embodiment of the invention population members are selected for replication using a stochastic remainder method. In the stochastic remainder method at least a certain number $I_i$ of copies of each population member are selected for replication in a successive generation. The number $I_i$ is given by the following equation:

EQU. 5:

$$I_i = Trunc\left(N * \frac{F_i}{\sum_{i=1}^{N} F_i}\right)$$

where, N is the number of population members in each generation; and

Trunc is the truncation function.

The fractional part of the quantity within the truncation function in equation 5 is used to determine if any additional copies of each population member (beyond the number of copies determined by equation five) will be replicated in a successive generation. The aforementioned fractional part is used as follows. A random number between zero and one is generated. If the aforementioned fractional part exceeds the random number then an addition copy the with population member is added to the successive generation. The number of selections made using random numbers and the fractional parts of numbers $I_i$ is adjusted so that successive populations maintain the total number of members N.

Using the above described stochastic remainder method leads to selection of population members for replication based largely on fitness, yet with a degree of randomness. The latter selection method mimics natural selection in biological systems.

In step 138 crossover operations are performed. One or two point or both types of crossover operations may be performed. In performing crossover operations populations members (rows of matrix 300) are paired together randomly. A single crossover probability or separate crossover probabilities may be used in deciding whether or not to perform one and two point crossover operations. For each type of cross over operation, and for each pair of population members a random number between zero and one is generated. If the random number is less than the crossover probability, then a crossover operation is performed, if the random number is greater than the crossover operation then the pair of population members is kept unchanged. Alternative methods for determining whether crossover operations are performed may be used. If it is determined that a one point crossover operation is to be performed between a pair of population members then a crossover point is selected at random. Thereafter, all the elements (codons) in the two population members (rows of matrix 300) that follow the crossover point are exchanged between the two rows. If it is determined that a two-point crossover operation is to be performed between two population members, then two points are selected at random and elements of the population members (rows of matrix 300) between the two points are exchanged. By representing each population as set of arrays of index (more preferably, a matrix of indexes, it is possible to use fast array manipulation operations (e.g., selection copying) to perform the cross over operations.

In step 140 mutation operations are performed. As in natural biological systems mutation occurs at a relatively slight rate (relative to crossover). In the algorithm 100, the rate of mutation is controlled by mutation probability parameter. In order to decide whether each population member is to be mutated, a random number is generated and compared to the mutation probability. If the random number generated for a given population member is less than the mutation probability, then the given population member is designated for mutation. In performing the mutation, an element of the population member is selected at random and replaced with an operand or operator that is selected at random from the operators and operands that were read in in step 102.

In step 142 rotation operations are performed. In order to decide whether each population member (array) is to be rotated, a random number is generated and compared to the rotation probability. If the random number generated for a given population member is less than the rotation probability, then the given population member is designated for rotation. In performing the rotation, a position of the designated population member array is selected at random, and the array is circularly shifted to the left to bring a codon at the selected position to the first position of the array.

Following step 142, the algorithm loops back to step block 106 in which begins the process of checking the syntax of the new population members that were created by crossover and mutation. Thereafter the algorithm repeats successive steps described above continuing to evolve successive generations, until a high fitness population member is found, or the generation limit is reached.

Figure 4:
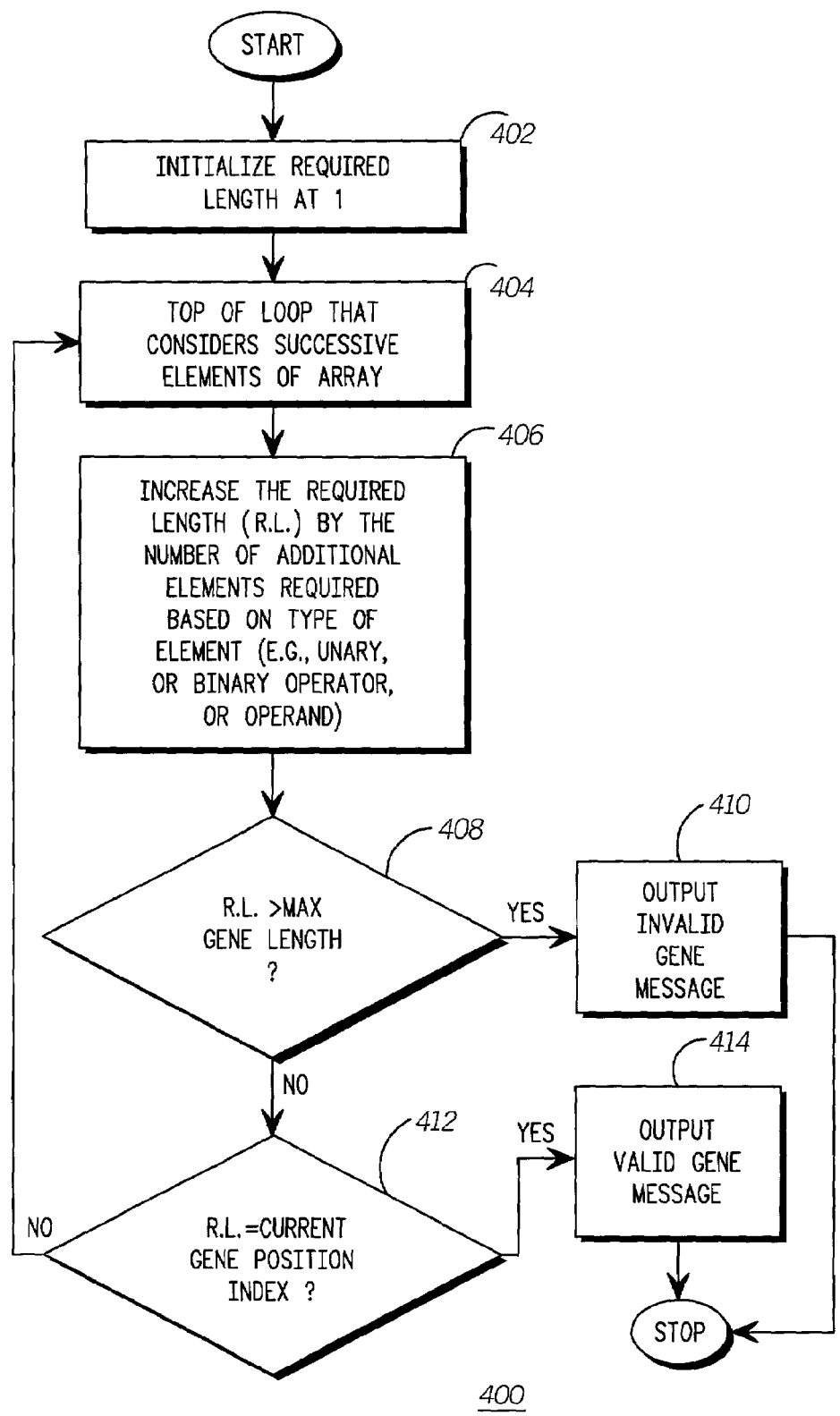
FIG. 4 is a flow diagram of an algorithm for validating syntax of a representation of a mathematical expression according to a preferred embodiment of the invention.

The randomness inherent in the initial population generation 104, crossover 138 and mutation 140 operations, may lead to population members that represent mathematical expressions that have invalid syntax. Such invalid population members are certainly not suitable as solution candidates, and have the potential to cause an execution error. Therefore as mentioned above, in connection with steps 108, 112 (FIG. 1) the syntax of each new population member is checked. FIG. 4 is a flow diagram of a syntax checking algorithm 400 for validating syntax of a representation of a mathematical expression according to a preferred embodiment of the invention. FIG. 4 is preferred form of step 108 shown in FIG. 1. Referring to FIG. 4, in the first block 402 a required length variable is initialized at a value of one. The next block 404 is the top of a loop that considers successive elements of a population member array. According to the preferred embodiment of the invention, the arrays take the form shown in FIG. 6, in which each array element refers to an operand or operator. A loop counter of the loop started in the second block 404, is used as a pointer that points to successive elements of a population member (array) under consideration. The elements of the array are labeled from one to N. In step 406 the required length variable is increased by a required number of additional elements that is based on the type of the element pointed to by the current value of the loop counter. The second column of tables I and II specify the type of each operand and operator, as an integer. The type number indicates the number of additional elements that are required for each operand or operator. For example, the addition and multiplication operators are of type two, and require two operands. The sine operator is of type one and only requires a single operand. Constants and variables are of type zero. By way of illustration, if for example the loop counter points to the first element of array 600 (FIG. 6), which contains an index of 14, 14 is looked up in the first column of table I and found to refer to the SQRT operator, which from the second column of table I is found to be of type one. Therefore the required length is increased from one (the initial value) to two. In the next iteration of the loop, the syntax checking algorithm reads index 2 which stands for the plus operator, and the required length variable is accordingly increased by two to a value of four. In an object-oriented implementation of the GEP algorithm 100, type information is preferably stored as an instance variable of the codon class shown above.

In step 408 the required length set in block 406 is compared to a maximum gene length (maximum array length shown as K in FIGS. 3, 6). If in step 408 the required length is found exceed the maximum gene length, then in step 410 an invalid gene message is output (e.g., reported to algorithm 100).

In block 412 it is determined if the current value of the loop counter (pointing to an element of array 600, FIG. 6) is equal to the required length variable. The loop counter being equal to the required length variable, means that there are sufficient operands to complete operations specified by operators included in the population member array being checked, and a valid syntax mathematical expression is encoded in the array. The required length variable being equal to the loop counter indicates that the end of a gene included in the array being checked has been reached. The gene is that portion of each array that represents a valid syntax mathematical expression. More often than not, less than the full length of a population member array is required to represent a valid syntax mathematical expression. However any unused array elements may become active in a subsequent generation through crossover or mutation. If the current value of the loop counter is equal to the required length variable then a valid gene message is output (e.g., reported to algorithm 100). If not, then the algorithm 400 loops back to step 404 in which the loop counter index is incremented, and thereafter the next element of the gene (array) is considered.

Using the syntax checking algorithm 400 allows random crossover, mutation and rotation operations on array representations of mathematical expressions, while avoiding the waste of computer time in generating and attempting to execute programs that have invalid syntax.

Advantageously the syntax checking operation is able to operate on array representations (e.g.,600, FIG. 6) of population members. Thus, there is no need to generate programs from population members in order to validate syntax, and consequently computer resources are saved and execution times for the syntax checking 400 and the main algorithm 100 are reduced.

Although the invention has been described with reference to the flow diagrams included in the FIGS., it will be apparent to persons of ordinary skill in the art that different programs flows may be used without departing from the spirit of the invention.

Figure 10:
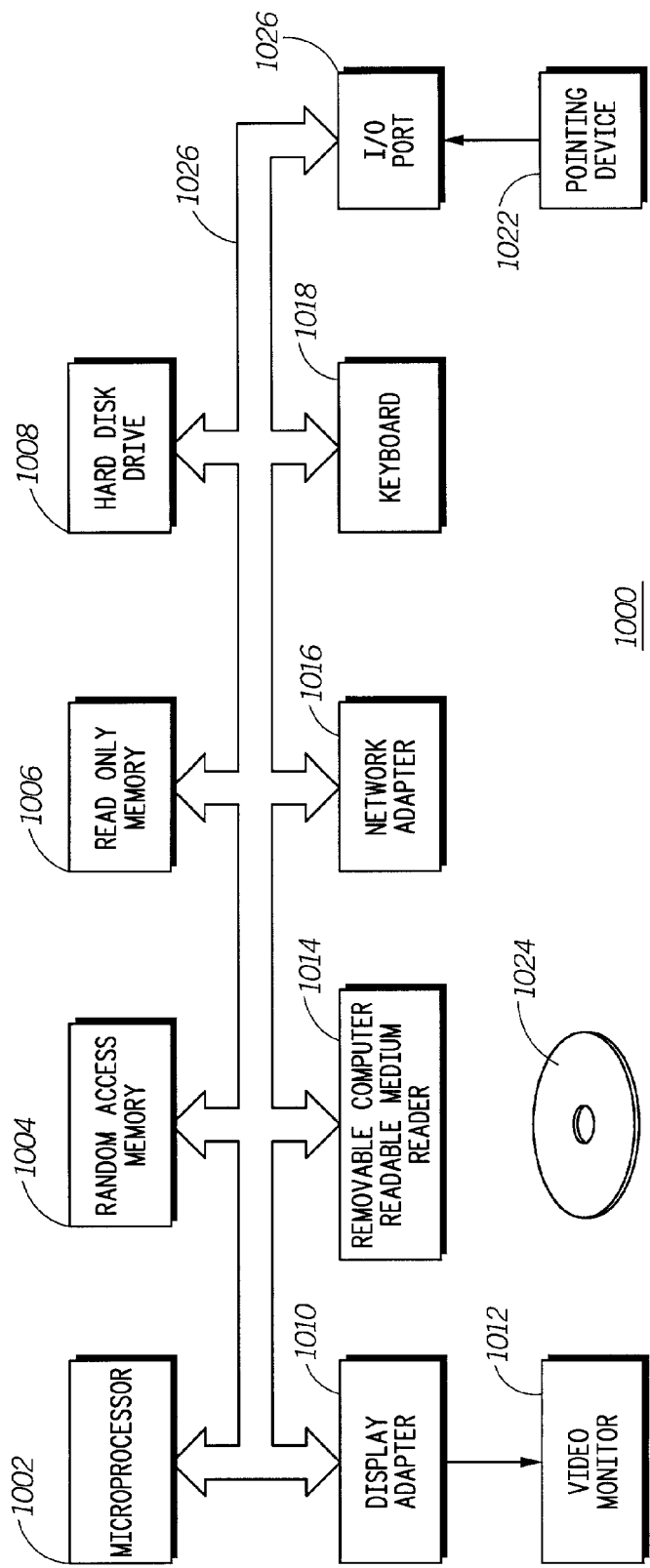
FIG. 10 is a block diagram of a computer used to execute the algorithms shown in FIGS. 1, 2 and 4 according to the preferred embodiment of the invention.

FIG. 10 is a block diagram of a computer 1000 used to execute the algorithms shown in FIGS. 1, 2 and 4 according to the preferred embodiment of the invention. The computer 1000 comprises a microprocessor 1002, Random Access Memory (RAM) 1004, Read Only Memory (ROM) 1006, hard disk drive 1008, display adopter 1010, e.g., a video card, a removable computer readable medium reader 1014, a network adapter 1016, keyboard, and I/O port 1020 communicatively coupled through a digital signal bus 1026. A video monitor 1012 is electrically coupled to the display adapter 1010 for receiving a video signal. A pointing device 1022, preferably a mouse, is electrically coupled to the I/O port 1020 for receiving electrical signals generated by user operation of the pointing device 1022. According to one embodiment of the invention, the network adapter 1016 is used, to communicatively couple the computer to an external source of data, e.g., a remote server. The computer readable medium reader 1014 preferably comprises a Compact Disk (CD) drive. A computer readable medium 1024, that includes software embodying the algorithms described above with reference to FIGS. 1, 2, 4 is provided. The software included on the computer readable medium is loaded through the removable computer readable medium reader 1014 in order to configure the computer 1000 to carry out processes of the current invention that are described above with reference to flow diagrams. The computer 1000 may for example comprise a personal computer or a work station computer.

As will be apparent to those of ordinary skill in the pertinent arts, the invention may be implemented in hardware or software or a combination thereof Programs embodying the invention or portions thereof may be stored on a variety of types of computer readable media including optical disks, hard disk drives, tapes, programmable read only memory chips. Network circuits may also serve temporarily as computer readable media from which programs taught by the present invention are read.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

We claim:

1. An apparatus for generating a program that solves a technical problem, the apparatus comprising:
    a computer configured by software to:
    generate an initial population of representations of programs that include a plurality of prime numbers; and
    evolve a succession of generations of representations of programs derived from the initial population;
    for one or more of said succession of generations, test programs represented by said representations of programs and when a fitness criteria that depends, at least, on an ability of said programs represented by said representations of programs to solve said technical problem is satisfied output one or more programs that satisfy said fitness criteria.

2. The apparatus according to claim 1, wherein the plurality of prime numbers are selected from a predetermined list of prime numbers.

3. The apparatus according to claim 1 wherein evolving the succession of generations includes:
    for a plurality of successive generations, mutating one or more representations of programs from a current population of representations of the programs by introducing representations of one or more prime numbers.

4. The apparatus according to claim 1 wherein evolving the succession of generations includes:
    for a plurality of successive generations:
        generating a set of programs that are represented in a population of representations of programs of a current generation;
        executing one or more of the set of programs for one or more sets of test data to obtain one or more results corresponding to the one or more of the sets of programs;
        deriving one or more indications of fitness of the one or more of the set of programs from the one or more results;
        selecting one or more of the representations from the population of representations of programs of the current generation for duplication in a successive generation based on the indications of fitness;
        performing one or more crossover operations between pairs of representations in the successive generation.

5. The apparatus according to claim 4 further comprising:
for one or more of the plurality of the successive generations, mutating one or more representations of programs from the current population of representations of the programs by introducing representations of one or more prime numbers.

6. The apparatus according to claim 1 wherein the initial population of representations of programs comprises:
a set of arrays of indexes, wherein
a plurality of the arrays include a list of indexes representing a program; and
a plurality of the indexes refer to elements selected from a group consisting of operators and operands.

7. An apparatus for generating a program that solves a technical problem, the apparatus comprising:
a computer configured by software to:
recursively generate a succession of populations of representations of programs, wherein each representation includes:
identifications of one or more operators selected from a set of operators; and
identifications of one or more operands selected from a set of operands that includes constants and variables;
wherein each operand in the set of operands, and each operator in the set of operators is associated with a cost;
for each kth population in the succession of populations generate a set of programs represented in the kth population of representations;
derive a first measure of fitness of each program in the set of programs by a process including:
running the program on one or more sets of test data and comparing output values to predetermined values to obtain a measure of residual error;
derive a second measure of fitness of each program in the set of programs by a process including:
summing the cost of each operator and operand in the program;
selectively duplicating individual representations of programs in each successive generation based on the first and second measures of fitness; and
when a combined fitness criteria that depends on said first and second measures of fitness is satisfied output one or more programs that satisfy said combined fitness criteria.

8. The apparatus according to claim 7: wherein the computer is also configured by software to:
combine the first measure of fitness with the second measure of fitness to obtain an overall measure of fitness.

9. An apparatus for generating a program that solves a technical problem, the apparatus comprising:
a computer configured by software to:
represent each of a succession of populations of programs as a set of arrays of indexes, wherein each array represents a program and one or more indexes in the set of arrays of indexes point to representations of program elements selected from a group of elements consisting of operators and operands;
for each kth population of the succession of populations:
generate a program represented by each of one or more of the set of arrays in the population;
derive a measure of fitness of each program;
select one or more high fitness arrays from the set of arrays based on the measure of fitness for carry over to a (k+1)th generation;
perform a cross over operation between one or more of the high fitness arrays carried over to the (k+1)th generation;
when said measure of fitness of a particular program satisfies a fitness criteria output said particular program.

10. The apparatus according to claim 9 wherein each index points to an instance of an object-oriented programming language class that encapsulates an identification of an element selected from a group consisting operators and operands.

11. The apparatus according to claim 9 wherein performing the crossover operation includes:
exchanging a portion of a high fitness array with a portion of a second array, wherein starting points for the portion of the high fitness array and the portion of the second array are selected at random.

12. The apparatus according to claim 9 wherein the set of arrays is stored as a matrix.

13. An apparatus for generating a program that solves a technical problem, the apparatus comprising:
a computer configured by software to:
recursively generate a succession of generations of a population of sequences of symbols wherein each sequence of symbols represents a program;
for each generation determining if each sequence of symbols can be translated into a viable program by:
for each sequence of symbols
initializing a required length variable;
starting with a first symbol of each sequence, and for a succession of kth symbols within each sequence:
increasing the required length variable by a number of symbols necessitated by syntax rules to form a viable operation with the kth symbol;
in the case that the required length variable after incrementing is equal to k reporting valid syntax; and
in the case that the required length variable when added to k exceeds a maximum sequence length reporting invalid syntax.

14. The apparatus according to claim 13 wherein recursively generating the succession of generations includes:
randomly altering symbols in one or more sequences of symbols.

15. The apparatus according to claim 13 wherein recursively generating a succession of generations includes:
selecting at random one or more points defining bounds of subsequences of symbols for exchange between sequences of symbols in the population.

16. A computer readable medium containing programming instructions for determining a mathematical expression that describes a set of real world data generating a program that solves a technical problem, including programming instructions for:
generating an initial population of representations of mathematical programs that include a plurality of prime numbers; and
evolving a succession of generations derived from the initial population;
for one or more of said succession of generations, testing programs represented by said representations of programs and when a fitness criteria that depends, at least, on an ability of said programs represented by said representations of programs to solve said technical problem is satisfied outputting one or more programs that satisfy said fitness criteria.

17. The computer readable medium according to claim 16, wherein the programming instructions for evolving the succession of generations include programming instructions for:
  selecting the plurality of prime numbers from a predetermined list of prime numbers.

18. The computer readable medium according to claim 16 wherein the programming instructions for evolving the succession of generations include programming instructions for:
  for a plurality of successive generations, mutating one or more representations of programs from a current population of representations of the programs by introducing representations of one or more prime numbers.

19. The computer readable medium according to claim 16 wherein the programming instructions for evolving the succession of generations include programming instructions for:
  for a plurality of successive generations:
    generating a set of programs embodying programs that are represented in a population of representations of programs of a current generation;
    executing one or more of the set of programs for one or more sets of test data to obtain one or more results corresponding to the one or more of the sets of programs;
    deriving one or more indications of fitness of the one or more of the set of programs from the one or more results;
    selecting one or more of the representations from the population of representations of programs of the current generation for duplication in a successive generation based on the indications of fitness;
    performing one or more crossover operations between pairs of representations in the successive generation.

20. The computer readable medium according to claim 19 wherein the programming instructions for evolving the succession of generations further comprise programming instructions for:
  for one or more of the plurality of the successive generations, mutating one or more representations of programs from the current population of representations of the programs by introducing representations of one or more prime numbers.

21. The computer readable medium according to claim 16 wherein the initial population of representations of programs comprises:
  a set of arrays of indexes, wherein
  a plurality of the arrays include a list of indexes representing a program; and
  a plurality of the indexes refer to elements selected from a group consisting of operators and operands.

22. A computer readable medium containing programming instructions for generating a program that solves a technical problem, including programming instructions for:
  recursively generating a succession of populations of representations of programs, wherein each representation includes:
    identifications of one or more operators selected from a set of operators; and
    identifications of one or more operands selected from a set of operands that includes constants and variables;
    wherein each operand in the set of operands, and each operator in the set of operators is associated with a cost;
  for each kth population in the succession of populations generating a set of programs represented in the kth population of representations;
  deriving a first measure of fitness of each program in the set of programs by a process including:
    running the program on one or more sets of test data and comparing output values to predetermined values to obtain a measure of residual error;
  deriving a second measure of fitness of each program in the set of programs by a process including:
    summing the cost of each operator and operand in the program;
  selectively duplicating individual representations of programs in each successive generation based on the first and second measures of fitness; and
  when a combined fitness criteria that depends on said first and second measures of fitness is satisfied outputting one or more programs that satisfy said combined fitness criteria.

23. The computer readable medium according to claim 22 further comprising programming instructions for:
  combining the first measure of fitness with the second measure of fitness to obtain an overall measure of fitness.

24. A computer readable medium containing programming instructions for generating a program that solves a technical problem, including programming instructions for:
  representing each of a succession of populations of programs as a set of arrays of indexes, wherein each array represents a program and one or more indexes point to representations of a program element selected from a group of elements consisting of operators and operands;
  for each kth population of the succession of populations:
  generating a program represented by each array in the population;
  deriving a measure of fitness of each generated program;
  selecting one or more high fitness arrays based on the measure of fitness for carry over to a (k+1)th generation;
  performing a cross over operation between one or more of the high fitness arrays carried over to the (k+1)th generation;
  when said measure of fitness of a particular program satisfies a fitness criteria outputting said particular program.

25. The computer readable medium according to claim 24 wherein each index points to an instance of an object-oriented programming language class that encapsulates an identification of an element selected from a group consisting operators and operands.

26. The computer readable medium according to claim 25 wherein the programming instructions for performing a cross over operation include programming instructions for:
  exchanging a portion of a high fitness array with a portion of a second array, wherein starting points for the portion of the high fitness array and the portion of the second array are selected at random.

27. The computer readable medium according to claim 25 wherein the set of arrays is stored as a matrix.

28. A computer readable medium containing programming instructions for generating a program that solves a technical problem, including programming instructions for:
  recursively generating a succession of generations of a population of sequences of symbols wherein each sequence of symbols represents a program;

for each generation determining if each sequence of symbols can be translated into a viable program by:
for each sequence of symbols initializing a required length variable;
starting with a first symbol of each sequence, and for a succession of kth symbols within each sequence:
increasing the required length variable by a number of symbols necessitated by syntax rules to form a viable operation with the kth symbol;
in the case that the required length variable after incrementing is equal to k reporting valid syntax; and
in the case that the required length variable when added to k exceeds a maximum sequence length reporting invalid syntax.

29. The computer readable medium according to claim 28 wherein the programming instructions for recursively generating a succession of generations include programming instructions for:
randomly altering symbols in one or more sequences of symbols.

30. A computer readable medium according to claim 28 wherein the programming instructions for recursively generating a succession of generations include programming instructions for:
selecting at random one or more points defining bounds of subsequences of symbols for exchange between sequences of symbols in the population.

31. A computer readable medium having stored there on a data structure comprising:
an objected oriented programming language class including:
a codon name instance variable;
a codon type instance variable for storing a first number that is indicative of a number of codons that are to be associated with a codon specified in the codon name instance variable;
a codon value instance variable for storing a value associated with the codon specified in the codon name instance variable;
a codon cost instance variable for storing a second number that is indicative of a degree to which an operator or operand specified by the codon specified in the codon name instance variable increase complexity of a mathematical expression; and
a codon index instance variable for storing an index associated with each instance of the object-oriented programming language class.

* * * * *